Patented Oct. 20, 1936

2,058,247

UNITED STATES PATENT OFFICE 2,058,247

PROCESS FOR CHEMICALLY CREAMING LATEX

John McGavack, Leonia, N. J., assignor to United States Rubber Company, New York, N. Y., a corporation of New Jersey No Drawing. Application October 11, 1934, Serial No. 747,928

10 Claims. (Cl. 18—50)

This invention relates to a process for chemically creaming rubber latex and more particularly for increasing the output of any given creaming equipment over that possible by present chemical creaming operations.

In the present methods of chemically creaming latex, for example a normal latex having 32 to 36% solids content, a hydrophilic organic colloid such as gum tragacanth, glue, Irish moss, pectin, ammonium alginate, or the like, is added to the latex to produce a separation of a rubber-rich cream portion and a rubber-poor serum portion. This creaming operation is generally allowed to take place at atmospheric temperature by a gravity separation of the cream and serum portions and requires as a rule anywhere from twenty-four to forty-eight hours for completion. In practice forty-eight hours is generally the time allowed to attain a cream concentration of about 60% solids or higher. The rubber-rich or cream portion is then recovered. If the creaming cycle is to be repeated to produce a more purified latex having a reduced proportion of naturally-occurring water-soluble constituents, the cream is diluted to approximately the original concentration of the latex, additional creaming agent is added to replace that withdrawn in the serum portion, and the mixture again allowed to stand from twenty-four to forty-eight hours to produce a more highly purified cream, again of about 60% solids content. These operations of creaming and dilution may be repeated until the desired degree of purification of the latex has been reached. In the production of a latex for electrical insulation purposes, for example, three successive creaming cycles are usually carried out, producing in such case a purified creamed latex of about 60% solids content and containing not more than about 0.2% of naturally-occurring water-soluble constituents on a dry rubber basis. If desired, the cream may be diluted to any concentration, this time without the addition of creaming agent, in order to produce a stable purified latex of any desired concentration.

Various methods have been suggested for decreasing the time necessary for the usual creaming operation to a concentration of about 60% which at ordinary temperature requires from twenty-four to forty-eight hours for each creaming. Heat, live steam, the application of an electrical potential to the latex, and vigorous agitation of the latex for a short period of time before, during or after the addition of the creaming agent have all been suggested for shortening the time necessary for the desired creaming.

The present invention relates to methods of increasing the output of creaming equipment in chemical creaming processes, and is applicable to normal creaming by gravity separation at room temperatures as well to those creaming operations where the latex itself is treated for decreasing the time necessary for the desired creaming as described above.

I have discovered that in chemical creaming processes according to present practice, the separation of serum from cream proceeds at a relatively high rate only during the early part of the process, and that as a result the major proportion of the serum separation takes place in only a small fraction of the time required for ultimate creaming to the usual 60% solids content; and furthermore that, following the period of rapid creaming, the creaming rate decreases to a very low value within a comparatively short time and thereafter remains at an ever-diminishing low level. More particularly, I have discovered that in such creaming processes more than two-thirds and in most cases more than three-fourths of the ultimate serum separation takes place in from one-fifth to one-fourth of the time usually allowed for the ultimate separation of a cream of about 60% solids content. During this initial period of relatively rapid creaming, the cream separated reaches a solids content of about 45 to 55%. The relative volume of the serum may vary considerably according to the initial concentration of the latex, but when the latex has initially a solids content of about 32 to 36%, the serum which separates during this period generally constitutes from about 30 to 45% of the bulk of the latex.

As stated above, between the earlier period of rapid creaming and the later period of slow creaming there is a relatively short intermediate period during which the creaming rate decreases rapidly from the high level to the low level. The mid-point of this intermediate period coincides with the "break" in the creaming rate or the point at which the creaming rate is decreasing most rapidly. The observed rate of serum separation at the "break" in the creaming rate has a value which varies somewhat according to the maximum rate of serum separation attained during the earlier part of the creaming, and this in turn depends largely on the condition of the latex, particularly upon its age as well as treatments to which it may have been subjected in order to decrease the actual time for creaming to a desired concentration. Thus, in the case of an untreated latex which has been stored several weeks or months prior to creaming, as, for example, an alkali-preserved latex which has been imported from distant plantation countries, the maximum creaming rate attainable may be upwards of 10% per hour( expressed as volume of serum separating per hour with reference to the total volume of the latex), and the "break" in the creaming rate will correspond to a rate of serum separation of from about 2 to 3% per hour, usually about 2.5% per hour. On the other hand, the maximum rate of serum separation attainable with untreated fresh latex, that is, latex which is not more than a few days old, may be as low as about 2% per hour, the rate during the intermediate period falling through a midpoint value of less than 1% and generally of approximately 0.5% per hour, and thereafter quickly reaching a value of less than 0.1% per hour.

The rate of serum separation at the "break" in the creaming rate of a fresh latex to which a small amount of soap has been added prior to creaming as described in my co-pending application Serial No. 658,137 filed Feb. 23, 1933, now Patent No. 1,983,703 granted Dec. 11, 1934, will be substantially the same as that of an old latex, namely about 2 to 3% per hour, while the maximum creaming rate is around 4 to 5% per hour. When the latex is creamed at an elevated temperature, the rate of serum separation at the "break" in the creaming rate remains approximately the same as for a creaming at ordinary temperature. The speeding up of the creaming operation by the application of an electrical potential to the latex during creaming as described in my Patent No. 1,921,575, granted August 8, 1933, or by a violent agitation of the latex for a short period of time shortly before or after, or during the addition of the creaming agent as described in my co-pending application Serial No. 677,466 filed June 24, 1933, now Patent No. 1,989,241, granted Jan. 29, 1935, results in a rate of serum separation, at the "break" in the creaming rate, of from about 4 to 6% per hour, rather than the 2 to 3% per hour for untreated latex or latex that is creamed at an elevated temperature.

According to the present invention, I utilize this discovery to increase the output of equipment in creaming operations by interrupting the first creaming cycle by separating the cream and serum portions at any time within the short intermediate period during which the creaming rate decreases rapidly from the high level to the low level, diluting the cream with either water or more latex, depending on whether the equivalent of a multiple- or of a single-creamed latex is desired, adding the amount of creaming agent necessary to maintain the proper concentration for creaming, and resuming the creaming operation. The second creaming cycle may likewise be interrupted near the point where the creaming rate is decreasing most rapidly, and water or more latex may be added and a new creaming cycle begun, each cycle requiring only a fraction of the time ordinarily necessary for a complete creaming operation. Of course, in the final cycle, the cream may be allowed to reach any desired concentration. While the rate of creaming undergoes a rapid decrease within a relatively short time compared to the period allowed for complete creaming according to normal practice, the change is not instantaneous, consequently the time at which to interrupt the creaming rate need not be determined with exactitude, but may be taken as being any point within the intermediate period, as described above.

As may be seen from the above discussion, there are four parameters by which the proper time to interrupt the creaming cycle can be judged, namely: (1) the rate of serum separation or rate of cream; (2) the solids content of the cream; (3) the actual relative volume of the serum; and (4) the time elapsed relative to the time required for ultimate creaming to a solids content of about 60%. Factors (1) and (2) are the most reliable. Factor (1) is dependent, however, on the condition of the latex, particularly its age and treatments to which it may have been subjected, as above described. Factor (2) is the most fundamental. Factor (3) is subject to wide variation depending on the dilution at which the creaming cycle is started. Factor (4) like factor (2) is independent of the age or treatment of the latex but the numerical value of the time ratio of factor (4) is more or less accidental and may vary somewhat because of the more or less arbitrary standard of ultimate creaming.

According to the present invention, for example, in creaming a normal latex of about 32 to 36% solids content, the latex and creaming agent are introduced into the available tank equipment. The first creaming cycle is interrupted at a point where it is determined that (1) the rate of serum separation has fallen, if an old untreated latex, to a value of about 2 to 3% per hour, or if a fresh untreated latex, to a value of about .5 to 1% per hour; or (2) the rubber-rich portion has reached a solids content of about 45 to 55%; or (3) the volume of serum is from about 30 to 45% of the total volume of the latex; or (4) when the time elapsed is from about one-fifth to one-quarter of the time required for ultimate creaming of the latex to about 60% solids content. If it is desired to increase the amount of once creamed latex produced in a given time, then there is mixed with the cream at the interruption of the first cycle an amount of uncreamed latex, substantially equal to the volume of serum which has been withdrawn together with sufficient additional creaming agent to make the concentration thereof equal to that at the start of the first creaming cycle (the concentration of creaming agent being figured with reference to the weight of water present), and the mixture allowed to cream to any desired solids content. By such dilution of the cream with uncreamed latex, the total amount of rubber (dry weight) in the creaming tank is substantially increased, in proportion to the amount of uncreamed latex thus added, and the amount of cream finally obtained is greater in the same proportion. For example, when 40% of serum is withdrawn in the first cycle and is replaced with an equal volume of uncreamed latex, the total amount of rubber in the vessel is increased by 40%, and the amount of rubber obtained as once-creamed latex at the end of the second cycle is likewise increased by 40%. The volume of serum separating during the second cycle, for a given cream concentration, is of course less than that in the first cycle, because of the higher initial solids content of the latex in the second cycle. However, the total volumes of serum and of cream, respectively, produced by this method will be identical with the amounts produced had the entire volume of latex utilized been creamed all at once. Obviously the output may be still further increased, but in a smaller proportion, by diluting the second cream with uncreamed latex and carrying through a third creaming cycle.

If it is desired to increase the purity of the latex in a given time, then there is mixed with the cream at the interruption of the first cycle an amount of water substantially equal to the volume of serum which has been withdrawn together with sufficient additional creaming agent to make the concentration thereof equal to that at the start of the first creaming cycle. The second creaming cycle then proceeds in a manner substantially identical with that of the first cycle, the creaming rate, or rate of serum separation, following practically the same course as before. The mixture may be allowed to cream to any desired solids content, or as many creaming cycles as desired may be carried out by interrupting the cycle near the point at which the creaming rate is decreasing most rapidly, diluting as before and starting a new cycle. Since each interrupted cycle takes but one-fourth or less of the time usually allotted for a complete cycle to cream to a solids content of about 60%, it is readily seen that three or four successive interrupted creaming cycles may be carried out according to the present invention in a length of time previously required for one cycle. Since the degree of purification of the latex effected in four interrupted creaming cycles according to this invention is substantially equal to that effected in three cycles according to common practice, (the concentration of the purified cream will be less however) it follows that the equivalent of the purification of ordinary thrice-creamed latex can now be produced in the same length of time formerly required for the production of only once-creamed latex. If the last creaming cycle according to the present invention is allowed to go to completion, a slightly longer time, of course, will be required. There is also a slightly greater amount of serum solids left in the rubber-rich portion at each uncompleted creaming cycle than if the creaming had proceeded to a substantially 60% cream in every cycle, but since the great majority of the possible creamings are generally utilized in purifying latex, this small additional amount of serum solids remaining in the cream has an almost negligible result, and may be altogether obviated by carrying out, for example, four successive creaming cycles, as disclosed above, in place of the three cycles usually employed for the production of purified latex containing not more than about 0.2% of naturally-occurring water-soluble constituents (based on the dry solids content). The slightly greater total amount of creaming agent used in such case is more than compensated for by the great economies in time and equipment which are effected by the practice of the invention. By the present invention no more creaming agent is used in each creaming cycle than would normally be used in carrying the creaming operation to completion.

The following tables are intended to exemplify the practice of the present invention under various conditions of creaming and are intended to be merely illustrative of the invention and in no way restrictive thereof.

In the tables, Table I, columns 1–4, show the conditions of creaming, column 1 the initial solids content of the various latex samples, column 2 the creaming agent used, column 3 the amount of creaming agent (in parts of creaming agent per 100 parts of solids content of the latex), and column 4 the physical conditions to which the latex was subjected before or during the creaming. Column 5 indicates the time required to produce a cream of 60% solids content according to normal practice under the given conditions. Column 6 shows the time at which the "break" in the creaming rate occurred and at which the creaming cycle should be interrupted. Columns 7 and 8 give the volume of serum which had separated (based on the bulk of the latex), and the solids content of the cream formed, respectively, at the period indicated in column 6. Table II has reference to the same examples illustrated in Table I and shows the instantaneous rate of creaming or rate of serum separation at various intervals during the creaming cycle expressed as volume of serum separating per hour with reference to the total volume of latex. Examples 1 to 9 were old latices which had been shipped into the United States. Example 10 was a fresh latex in a plantation country which had been tapped two days.

TABLE I

| | 1 | 2 | 3 | 4 |
|---|---|---|---|---|
| | Initial concentration of latex | Creaming agent used | Amount of creaming agent | Special conditions (temp., etc.) |
| | Percent | | | |
| 1 | 33 | Ammonium alginate | 0.20 | 60° C. |
| 2 | 33 | do | 0.20 | 35° C. |
| 3 | 36 | do | 0.20 | 35° C. |
| 4 | 36 | do | 0.20 | 60° C. |
| 5 | 32 | do | 0.20 | See Note I |
| 6 | 33 | do | 0.20 | See Note II |
| 7 | 33 | Locust bean gum | 0.18 | 25° C. |
| 8 | 33 | Ammonium alginate | 0.20 | 25° C. |
| 9 | 33 | Locust bean gum | 0.20 | 45° C. |
| 10 | 32 | Ammonium alginate | 0.15 | See Note III |

| | 5 | 6 | 7 | 8 |
|---|---|---|---|---|
| | Time needed to produce cream of 60% T. S. (hrs.) | Time elapsed at "break" in creaming rate (hrs.) | Volume of serum at "break" | Solids content of cream at "break" |
| | | | Percent | Percent |
| 1 | 15 | 3.0 | 41.5 | 51.4 |
| 2 | 30 | 7.0 | 36 | 48.3 |
| 3 | 40 | 10.0 | 29 | 47.1 |
| 4 | 14 | 3.0 | 36 | 52.6 |
| 5 | 10 | 2.3 | 44 | 52.3 |
| 6 | 8 | 2.0 | 38 | 50.5 |
| 7 | 28 | 6.5 | 42 | 51.1 |
| 8 | 32 | 7.5 | 36 | 48.3 |
| 9 | 20 | 5.0 | 45 | 53.2 |
| 10 | 120 | 24 | 45 | 52 |

TABLE II

*Rate of serum separation*

| | 120 min. before the "break" | 30 min. before the "break" | At the "break" | 30 min. after the "break" | 120 min. after the "break" |
|---|---|---|---|---|---|
| | Percent | Percent | Percent | Percent | Percent |
| 1 | 19.2 | 4.4 | 2.2 | 1.7 | 0.8 |
| 2 | 9.2 | 4.2 | 2.5 | 1.4 | 0.7 |
| 3 | 10.0 | 4.5 | 2.6 | 1.6 | 1.0 |
| 4 | 15.1 | 3.0 | 2.3 | 1.4 | 1.0 |
| 5 | 17.3 | 12.8 | 5.4 | 1.9 | 0.4 |
| 6 | 25.4 | 6.0 | 4.3 | 1.9 | 1.4 |
| 7 | | 3.7 | 2.4 | 1.2 | |
| 8 | | 3.7 | 2.4 | 1.9 | |
| 9 | 18.0 | 3.6 | 2.3 | 1.8 | 0.9 |

*Note I.*—The latex was subjected to violent agitation as described in my co-pending application Serial No. 677,466, filed June 24, 1933, now Patent No. 1,989,241 granted Jan. 29, 1935.

*Note II.*—The latex was subjected to an applied electrical potential as described in my Patent No. 1,921,575, granted August 8, 1933.

*Note III.*—The latex contained 1.25% ammonia and 0.3% of ammonium laurate (based on the total weight of the latex) in order to decrease the creaming time as described in my co-pending application Serial No. 658,137, filed Feb. 23, 1933, now Patent No. 1,983,703 granted Dec. 11, 1934.

As may be seen from the above tables, the rate of creaming undergoes at the "break" a rapid decrease from a relatively high value to a relatively low value. This "break" in the creaming rate may readily be determined in creaming operations by means of any one or more of the four parameters described above, and which are clearly illustrated in the tables. Column 6 shows the actual time elapsed at the "break" in the creaming rate, which is one-fifth to one quarter the time found to be necessary for ultimate creaming to a concentration of about 60% total solids under the conditions of creaming. Column 7 represents the volume of serum at the "break" in the creaming rate and is approximately 30 to 45% of the bulk of the latex for a latex of solids content of about 32 to 36%. Column 8 illustrates that the solids content of the cream at the "break" is about 45 to 55%. Table II shows that the actual rate of increase of serum volume or serum separation at the "break" is about 2 to 3% of the total volume of the latex per hour for old latex untreated and creamed at room or elevated temperatures. The actual rate of serum separation at the "break" for old latex under electrical stress or subject to violent agitation for a short period of time is about 4 to 6%.

The data of Tables I and II give a complete picture of only the first creaming cycle for each of a number of latex samples. In order to effect economies in the creaming of any of such latices, the first cycle is interrupted at a point corresponding approximately to the "break" in the creaming rate, the serum portion is withdrawn, the cream diluted with water or uncreamed latex to the desired extent, sufficient creaming agent added to replace that which was carried away in the serum in the first cycle, and a second creaming cycle allowed to proceed as above described.

From the above detailed disclosure of the invention, it is evident that numerous modifications will suggest themselves to those skilled in the art and it is not desired to limit the invention otherwise than as set forth in the appended claims.

Having thus described my invention, what I claim and desire to protect by Letters Patent is:

1. In the process of chemically creaming latex, the steps comprising interrupting the creaming operation and separating the rubber-rich and serum portions at the period in which the rate of creaming decreases rapidly from a comparatively high to a comparatively low value, as when the solids content of the rubber-rich portion is about 45 to 55% total solids, or when one-fifth to one-quarter of the time for creaming to a solids content of about 60% has elapsed, diluting the rubber-rich portion and adding a creaming agent thereto, allowing the same to cream, and separating the rubber-rich and serum portions.

2. In the process of chemically creaming a latex of a solids content of about 32 to 36%, the steps comprising interrupting the creaming operation and separating the rubber-rich and serum portions when the volume of serum produced is equal to about 30 to 45% of the volume of the latex being creamed, diluting the rubber-rich portion and adding a creaming agent thereto, allowing the same to cream, and separating the rubber-rich and serum portions.

3. In the process of chemically creaming at normal or elevated temperatures, an otherwise untreated old latex or a fresh latex to which a small amount of soap has been added, the steps comprising interrupting the creaming operation and separating the rubber-rich and serum portions when the rate of increase of serum volume per hour has decreased to about 2 to 3% of the total volume of the latex being creamed, diluting the rubber-rich portion and adding a creaming agent thereto, allowing the same to cream, and separating the rubber-rich and serum portions.

4. In the process of chemically creaming an old latex, or a fresh latex to which a small amount of soap has been added, while the latex is being subjected to an applied electrical potential, or after the latex has been subjected to violent agitation for a short period of time shortly before or after, or during the addition of the creaming agent, the steps comprising interrupting the creaming operation and separating the rubber-rich and serum portions when the rate of increase of serum volume per hour has decreased to about 4 to 6% of the total volume of the latex being creamed, diluting the rubber-rich portion and adding a creaming agent thereto, allowing the same to cream, and separating the rubber-rich and serum portions.

5. In the process of chemically creaming latex, the steps comprising interrupting the creaming operation and separating the rubber-rich and serum portions at the period in which the rate of serum separation decreases rapidly from a comparatively high to a comparatively low value, as when the solids content of the rubber-rich portion is about 45 to 55% total solids, or when one-fifth to one-quarter of the time for creaming to a solids content of about 60% has elapsed, adding water and a creaming agent to the rubber-rich portion, allowing a second creaming cycle to proceed until the period in which the rate of serum separation decreases rapidly from a comparatively high to a comparatively low value, as when the solids content of the rubber-rich portion is about 45 to 55% total solids, or when one-fifth to one-quarter of the time for creaming to a solids content of about 60% has elapsed, interrupting the second creaming cycle and separating the rubber-rich and serum portions, adding water and a creaming agent to the rubber-rich portion, allowing the same to cream, and separating the rubber-rich and serum portions at such period.

6. In the process of chemically creaming latex, the steps comprising interrupting the creaming operation and separating the rubber-rich and serum portions at the period in which the rate of serum separation decreases rapidly from a comparatively high to a comparatively low value, as when the solids content of the rubber-rich portion is about 45 to 55% total solids, or when one-fifth to one-quarter of the time for creaming to a solids content of about 60% has elapsed, adding uncreamed latex and a creaming agent to the rubber-rich portion, allowing the same to cream, and separating the rubber-rich and serum portions.

7. In the process of chemically creaming at normal or elevated temperatures, an otherwise untreated old latex or a fresh latex to which a small amount of soap has been added, the steps comprising interrupting the creaming operation and separating the rubber-rich and serum portions when the rate of increase of serum volume per hour has decreased to about 2 to 3% of the total volume of the latex being creamed, adding uncreamed latex and a creaming agent to the rubber-rich portion, allowing the same to cream, and separating the rubber-rich and serum portions.

8. In the process of chemically creaming an old latex, or a fresh latex to which a small amount of soap has been added, while the latex is being subjected to an applied electrical potential, or after the latex has been subjected to violent agitation for a short period of time shortly before or after, or during the addition of the creaming agent, the steps comprising interrupting the creaming operation and separating the rubber-rich and serum portions when the rate of increase of serum volume per hour has decreased to about 4 to 6% of the total volume of the latex being creamed, adding uncreamed latex and a creaming agent to the rubber-rich portion, allowing the same to cream, and separating the rubber-rich and serum portions.

9. In the process of chemically creaming at normal or elevated temperatures, an otherwise untreated old latex or a fresh latex to which a small amount of soap has been added, the steps comprising interrupting the creaming operation and separating the rubber-rich and serum portions when the rate of increase of serum volume per hour has decreased to about 2 to 3% of the total volume of the latex being creamed, adding water and a creaming agent to the rubber-rich portion, allowing the same to cream, interrupting the second creaming when the rate of increase of serum volume per hour has decreased to about 2 to 3% of the total volume of the latex being creamed, and separating the rubber-rich and serum portions, adding water and a creaming agent to the rubber-rich portion, allowing the same to cream, and separating the rubber-rich and serum portions.

10. In the process of chemically creaming an old latex, or a fresh latex to which a small amount of soap has been added while the latex is being subjected to an applied electrical potential, or after the latex has been subjected to violent agitation for a short period of time shortly before or after, or during the addition of the creaming agent, the steps comprising interrupting the creaming operation and separating the rubber-rich and serum portions when the rate of increase of serum volume per hour has decreased to about 4 to 6% of the total volume of the latex being creamed, adding water and a creaming agent to the rubber portion, allowing the same to cream, interrupting the second creaming when the rate of increase of serum volume per hour has decreased to about 4 to 6% of the total volume of the diluted latex and separating the rubber-rich and serum portions, adding water and a creaming agent to the rubber-rich portion, allowing the final creaming cycle to proceed until the cream has reached a concentration of at least about 60%, and separating the rubber-rich and serum portions.

JOHN McGAVACK.